United States Patent
Ederer et al.

(10) Patent No.: US 6,838,035 B1
(45) Date of Patent: Jan. 4, 2005

(54) RAPID-PROTOTYPING METHOD AND APPARATUS

(75) Inventors: Ingo Ederer, Pflaumdorf (DE); Rainer Hochsmann, Genderkingen (DE)

(73) Assignee: Voxeljet Technology GmbH, Augsburg (DE)

( * ) Notice: Subject to any disclaimer, the term of this patent is extended or adjusted under 35 U.S.C. 154(b) by 304 days.

(21) Appl. No.: 10/110,006

(22) PCT Filed: Oct. 9, 2000

(86) PCT No.: PCT/EP00/09892

§ 371 (c)(1),
(2), (4) Date: Apr. 8, 2002

(87) PCT Pub. No.: WO01/26885

PCT Pub. Date: Apr. 19, 2001

(30) Foreign Application Priority Data

Oct. 8, 1999 (DE) .......................... 199 48 591

(51) Int. Cl.⁷ ............................. B29C 41/02; B41J 2/01; B41J 2/04
(52) U.S. Cl. ............................. 264/308; 347/1; 347/54
(58) Field of Search .................... 264/308; 425/375, 425/449; 347/1, 54

(56) References Cited

U.S. PATENT DOCUMENTS

| | | | |
|---|---|---|---|
| 5,120,476 A | 6/1992 | Scholz | |
| 5,503,785 A | 4/1996 | Crump et al. | |
| 5,573,721 A | * 11/1996 | Gillette | ................ 264/298 X |
| 5,665,401 A | 9/1997 | Serbin et al. | |
| 6,270,335 B2 | * 8/2001 | Leyden et al. | ............ 425/375 |

FOREIGN PATENT DOCUMENTS

| | | |
|---|---|---|
| DE | 39 42 859 A1 | 7/1991 |
| DE | 195 15 165 A1 | 10/1996 |
| DE | 195 24 013 A1 | 1/1997 |
| EP | 0 581 445 A1 | 2/1994 |
| JP | 62275734 A * 11/1987 | ................ 264/298 |

* cited by examiner

*Primary Examiner*—Leo B. Tentoni
(74) *Attorney, Agent, or Firm*—Gates & Cooper LLP (57) ABSTRACT

A rapid-prototyping production method for producing a structural body by deposition, in several subsequent deposition steps, of subsequent layers of a building material one onto the other. The building material is selectively deposited in each layer in a liquid state in the form of droplets and being caused to solidify when deposited. After deposition, the layer is lowered into a supporting fluid which has a liquid state and has a density which is at least the same as the density of the building material.

43 Claims, 4 Drawing Sheets

RAPID-PROTOTYPING METHOD AND APPARATUS

The present invention relates to a method for manufacturing structural bodies, in particular casting molds or casting cores by a deposition technique (rapid-prototyping method) as well as to a rapid-prototyping apparatus suitable for performing the method.

With rapid-prototyping methods it is possible to manufacture a structural body based directly on geometrical data of the structural body generated by a CAD program, therein using a single manufacturing technique. Thus, it appears to be conceivable to build rapid-prototyping devices which are suitable to be used at places which are not specifically equipped for manufacturing processes, and which are suitable to lobe operated by persons who have not been specifically trained. For example, it is conceivable to provide devices for private individuals and home-workshops, respectively. One prerequisite for this is that, on the one hand, a sufficient number of inexpensive devices having a simple design can be offered and that, on the other hand, techniques are used which do not hold any safety risk in case of incorrect handling.

Among the rapid-prototyping methods there are two different groups of methods, such in which material deposited to the full surface is selectively bonded (selective bonding), and such in which material is, from the start, selectively deposited and bonded (selective application).

Stereolithography and Selective Laser Sintering (SLS) are examples for selective-bonding methods, i.e. for methods of the first group. In stereolithography a layer of a liquid photopolymer resin is deposited and selectively cured by selectively supplying energy by means of a slewable laser beam (cf. e.g. EP-0 171 069). In the SLS method (WO 88/02677) a layer of a sintering material is applied and selectively partially melted and thus bonded together by selectively supplying energy by means of a slewable laser beam. Each of the foregoing processes is repeated layer after layer in order to form a three-dimensional structural body. Each subsequent layer is supported by the solidified and non-solidified portions of the respective previous layer.

However, both stereolithography and SLS method are not suitable for the use in home-workshops. The laser technology that is used is too expensive on the one hand, and on the other hand it is too dangerous for the use by unskilled operators. Furthermore, the polymer resins used in stereolithography are not suitable for the use in home-workshops in view of their critical effect on the environment.

A different strategy of selective bonding does not require laser technology and photopolymers. According to the method according to EP-0 431 924 B1 a layer of particulate material is deposited. By selective deposition of a binder material the layer of particulate material is bonded together in selected areas and is thus bonded to the layer directly previously produced in the foregoing process cycle. This process is repeated several times. In a last step the particulate material which has remained unwetted by the binder material and is therefore not bonded is removed. The binder material can be deposited at low cost by means of drop-on-demand print heads known in printing technology.

However, the achievable accuracy of the generated surfaces is low in this method, since the deposited binder material partially spreads in the particulate material in an uncontrolled fashion. Furthermore, very complex equipment is required for depositing the layers of particulate material. Thus, this technique is not suitable for a device for the use in home-workshops either.

A method of selective deposition, i.e. of the second group of rapid-prototyping methods, is known from WO 95/05943. A building material is selectively deposited into selected subareas of the process area by means of a drop-on-demand print head. The remaining subareas are filled with molten wax as a supporting material also by means of a drop-on-demand print head. Each subsequent layer is deposited on a next preceding layer only after causing the solidification threof. This process is repeated layer after layer until the structural body is completed.

However, wax or similar supporting materials like resin materials can be applied by a drop-on-demand print head only in droplets of extremely small size due to the material-specific surface tension. Therefore, deposition of wax droplets for filling a large volume of the supporting structure per layer is extremely complex and can lead to manufacturing periods of several days for larger models.

In order to avoid these long manufacturing periods, methods have been developed in which the supporting structure is no longer formed by dropping wax onto the surface by drop-on-demand techniques, but by spreading a particulate material or a filler material by means of a doctor knife or the like.

An object of present invention is to provide a rapid-prototyping method and a rapid-prototyping apparatus which are suitable for use even in home-workshops with respect to costs and complexity on the one hand and safety aspects on the other hand.

There is a demand for having supported projecting and cantilevering portions of several layers during the production process by a supporting material filled in the next preceding layer for having a supporting surface onto which the building material of the subsequent layer for forming the projecting or cantilevering portions can be deposited. The present invention is based on the perception that it is not necessary to use solidified supporting materials for this purpose. Surprisingly it was found that even liquids can be effective and favourable as supporting materials for rapid-prototyping methods of the present kind, if those liquids have a density which is equal to or slightly higher than the density of the deposited building material.

The present invention is directed to a rapid-prototyping method for producing a structural body by a production process of multiple subsequent depositions of layers of building material. Each subsequent layer of building material is deposited onto the top surface of the next preceding layer of building material. The building material has a predetermined density and is selectively deposited for each layer in a liquid state in the form of droplets into selected subareas of a process area and is caused to start to solidify during deposition. After deposition, a supporting fluid having a liquid state is filled into remaining subareas which adjoin the selected subareas of the process area.

In a first aspect of the present invention, the supporting fluid is selected to have a density which is at least equal to the density of the building material when solidified and is selected to remain in its liquid state throughout the production process, and the remaining subareas of each next preceding layer are filled with the supporting fluid substantially up to the top surface of the building material of said each next preceding layer such that the top surface of the building material is not wetted with supporting fluid before the building material of the subsequent layer is deposited thereon.

The provision, to fill the remaining subareas of each next preceding layer without wetting the top surface thereof is proposed to be performed if a supporting liquid is used which would be effective as a separation agent if present between successive layers of building material thereby preventing the successive layers to adhere to each other.

However, in some cases, it may even be of advantage to have the top surface wetted by the supporting liquid if the latter is selected to help in solidification of the deposited building material and in adhering successive layers thereof to each other.

Accordingly, in a second aspect of the present invention, the supporting fluid is selected to have a density which is at least equal to the density of the building material and is selected to remain in its liquid state throughout the production process, and the remaining subareas of each next preceding layer are filled with the supporting fluid substantially up to the top surface of the building material of said each next preceding layer such that the top surface is wetted with the supporting liquid, before the building material of the subsequent layer is deposited thereon, and the building material is selected of liquid resin materials which are solidified by reaction with a chemical reaction agent which is contained in the supporting liquid.

If the building material is selected of liquid resin materials which are solidified by reaction with a chemical reaction agent contained in the supporting fluid, the chemical reaction will start at the latest when the deposited building material of the respective layer comes laterally into contact with the supporting liquid when the latter is filled into the remaining subareas of this layer. In that case, it may be not of importance if the top surface of the preceding layer is additionally be wetted with the supporting liquid before deposition of the building material thereon, so that the method can be carried out according to the first aspect of the invention without wetting the top surface with the supporting liquid before deposition of the building material of the subsequent layer. Wetting the top surface of the top surface, however, may additionally promote a cross linking of the building materials of adjacent layers between the top surface of the preceding layer and the bottom surface of the subsequent layer, so that it may be of additional advantage, to work according to the second aspect of the invention and to fill the remaining subareas of the preceding layer such that wetting of the top surface, indeed, is attained. Wetting the top surface may further be preferable for getting the top surface of the building material in the selected subareas as flush as possible with the liquid surface of the supporting liquid in the remaining subareas after filling the same in order to compensate for surface tension effects at the transition between the supporting liquid and the building material.

In both aspects of the present invention, it is preferred to have the top surfaces of the preceding layer and the liquid level of the supporting liquid as flush with each other as possible. When depositing droplets of building material in to the supporting liquid in remaining subareas, the droplet will dip into the supporting liquid to a small extent thereby causing some slight overlap of the too surfaces of the building material of the preceding layer and of the building material of the subsequent layer which was deposited on the supporting liquid in remaining subareas of the preceding layer. This will result in a kind of indentations between adjacent layers which in its turn may be favourable for stability of the structural body produced in this way.

Those slight overlaps of successive layers can be considered by calculation for the program control of the drop-on-demand application device and can be compensated by respective calculation of the uppermost layer of the structural body.

Since a method of selective application is used by the invention, it is not necessary to employ devices, such as selectively moved lasers and materials, such as photopolymers, which are not suitable for the use in home-workshops for reasons of safety.

Since a liquid instead of a solid material or bulk material is used as the supporting material, the complexity of the apparatus required for handling the supporting material is reduced significantly. This makes it possible to use apparatus which are of such a simple design and so inexpensive that they are suitable for home-workshops.

Furthermore, by using a liquid as the supporting material the separation of the structural body from the supporting material is simplified considerably.

Before a subsequent layer is deposited, the remaining subareas of the next preceding layer are filled with supporting liquid. This may be performed from above by an application device, e.g. by an application pipe from whichs the supporting liquid flows into the remaining subareas. Preferably, the production process is performed by using a receptacle in which the structural body is formed on a platform. The supporting liquid may be supplied into the receptacle until the liquid level of the supporting fluid in the receptacle is raised up to the level of the top surfaces of the preceding layer. In other cases, the receptacle may contain a reservoir of the supporting liquid and the preceding layer is lowered into the reservoir thereby causing the supporting liquid to flow into the remaining subareas until the liquid level thereof is substantially flush with the top surfaces of the preceding layer. Instead lowering the preceding layer, the receptacle may be raised relative to the preceding layer. It is possible that the preceding layer is completely submerged by the supporting liquid and the precding layer is subsequently lifted until the top surface of the layer and the surface of the supporting liquid are substantially flush with each other, whereafter the upper side of the layer is wiped or even scraped by means of a leveling instrument. This may even cause the top surfaces of the building material of the preceding layer to become unwetted again before deposition of the subsequent layer, though the top surface was submerged before into the supporting liquid. By wiping away excessive supporting liquid, the liquid level of the reservoir of supporting liquid may maintained constant. In other cases, which seem to be preferable, the liquid level of the reservoir is maintained constant by a respective overflow knife of the receptacle.

When using a supporting liquid as the supporting material, it is the particular sequence selected in forming the individual layers of the structural body which finally permits a selective and high precision formation of the structural body. In each step of depositing the building material the latter is deposited to already deposited and at least partly solidified building material of the previous layer or the building material is deposited in such a sequence that it is adhered laterally to building material already deposited in the current deposition cycle so that the building material is laterally attached to already deposited building material of the current layer.

It is possible that apart from the liquid supporting material no further supporting structures are provided. However, additional supporting structures may be provided which are produced from the building material during and along with the production of the structural part. After the production process of forming the structural body has been completed, those supporting structures of building material are removed. Supporting structures of this kind may increase the stability of the structural part, especially where long over-hanging portions of a layer are temporarily supported by additional supporting structures. Accordingly, in a preferred embodiment of the present invention, the deposition of building material for a layer includes forming of supporting structures for supporting a portion of a subsequent layer.

In particular, the first layer of the structural part, which is manufactured directly onto the base, may be manufactured to consist solely of individual spaced apart pin-shaped supporting structures for supporting the the next subsequent layer. Thus, it is avoided that a full-surface layer is formed directly on the base, which otherwise may lead to difficulties in separating the structural body from the base.

Where the selected subareas of a subsequent layer include a portion which is not connected to a top surface of the next preceding layer but should be deposited as an island on the supporting liquid in a remaining subarea of the preceding layer, a formation of supporting structures may also be used to avoid drifting of said 'swimming' portion in the supporting liquid and to avoid swimming up of this portion when lowering the layer into the supporting liquid for filling the remaining subareas of the layer. Such a portion of a subsequent layer may be a tip of a hanging portion intended to hang down from a layer above said subsequent layer.

Where a subsequent layer of the building material is intended to include extending portions of building material extending from a portion of the top surface of building material of the next preceding layer over portions of the remaining subareas of the next preceding layer, the extending portions may be formed by starting with deposition of building material from said portion of the top surface and proceeding with deposition of building material along the intended extending portion onto the supporting fluid which were filled into the remaining subareas of the next preceding layer. As an alternative, the extending portions of building material are formed by starting with deposition of building material onto the supporting fluid which were filled into the remaining subareas of the next preceding layer and proceeding with deposition of building material along the intended extending portion towards said portion of the top surface. This alternative may be preferable because shrinkage upon solidification of those portions of the building material which are deposited onto the supporting liquid will at least partly be a local shrinkage without resulting in a distortion of the whole layer.

The same shrinkage mechanism may be exploited generally if a layer of building material is not formed in a way that each subsequent drop of building material is immediately connected to the next preceding drop during deposition, but that single drops are deposited first as 'islands' which are connected to each other at a later stage by filling the interspaces therebetween.

Recess portions of a layer which are surrounded by wall portions of building materials can be filled with the supporting liquid by an application therof from above or by an overflowing of the supporting liquid over the surrounding wall portions when filling the remaining subareas outside thereof. Preferably, however, the surrounding wall portions are formed, by deposition of the building material which is controlled by a respective deposition program, with an opening allowing the supporting liquid to flow into the recess portion.

Before depositing a subsequent layer onto the top surfaces of building material of a preceding layer, it is preferred to level the top surfaces of the preceding layer to be in a continuous and flush horizontal plane. By leveling the top surfaces, irregularities can be compensated and the level of the top surfaces can be corrected according to a desired heigh of the respective layer. Leveling may be preformed by a leveling blade and/or even by heat radiation, if the building material is of a kind which melts and bleeds when subjected to heat.

The density of the supporting liquid is at least equal as compared to that of the building material. However, it is preferred that the supporting liquid has a higher density than the building material. A viscosity out of a wide range of viscosities is possible to be used for the supporting liquid. However, the supporting liquid preferably has a viscosity in the viscosity range from 150–400 mPa's. This way, the supporting liquid on the one hand provides a sufficient support to the building material, but on the other hand is flexible enough to take on a desired shape by flowing within a reasonable period of time. Further, the drops of the building material will not sink into the supporting liquid due to their kinetic energy when dropping onto the supporting liquid and will oppose drifting of deposited drops in the supporting liquid to a resonable extent.

According to the present invention it is preferred that, in particular in methods using a supporting liquid reservoir, the supporting liquid has a density which is only slightly higher than that of the building material, preferably 1.01 to 2 times as high, and further preferably 1.05 to 1.5 times as high. In this way it is achieved that on the one hand the building material deposited to the supporting liquid is supported by the latter, but on the other hand the structural body immersed into the supporting liquid in the receptacle does not experience any essential buoyancy, which would cause significant forces to act on the structural body and thus may cause damage to the structural body.

Preferably, a glycerine solution is used as supporting liquid though other liquid compositions may be used as will be appreciated by the skilled men. Further, the supporting liquid may contain additives for reducing the surface tension thereof. This may be favourable to have the liquid level of the supporting liquid as flush as possible with the top surfaces of the respective layers. When using a glycerine solution, an aqueous solution may be selected containing glycerine in an amount of 85 prozent by weight and proylenglycol 1.2-propandiole or polysorbate as additives.

According to the present invention, a building material which is suitable for selective application by means of a drop-on-demand technique should be used as the building material. Appropriate building materials are fusible materials such as a wax material or a thermoplastic material, having a viscosity of not more than 20 mPa's in a molten state of a temperature of not more than 130° C. so that they can be used in this state to be deposited by drop-on-demand techniques. Solidification of those fusible building materials are reached by cooling. In other cases, the building material is seleceted of liquid resin materials which are solidified by reaction with a chemical reaction agent which is contained in a chemical reaction atmosphere surrounding the building material during deposition thereof, and/or is contained in the suporting liquid itself as mentioneed above. The building material may even be selected of thermosettable resin materials which are dropped in an appropriate liquid state and are subjected to heat, e.g. radiation heat, for solidification thereof by thermosetting.

Further preferably a heated leveling instrument is used. This reduces the tendency of the supporting liquid to stick to the leveling instrument. Thus, a smoother surface of the supporting liquid deposited can be achieved.

According to the present invention selective application is understood as application in sub-areas which correspond to the geometrical cross-section in the respective layer of the structural body to be manufactured. The control of the movable dosing device for depositing the wax is performed on the basis of geometrical data of the structural body which are provided e.g. in the form of a CAD file.

Preferably, the layers of the structural body are produced to have a thickness between 0.05 and 1 mm. By selecting a layer thickness within this range an optimum compromise is reached between manufacturing accuracy and achievable manufacturing speed. Furthermore, when depositing the supporting liquid in layers with thicknesses below 0.05 mm, the requirements with respect to the leveling instrument arrangement and to the properties of the supporting liquid are increased due to the effects of the surface tension, which increases the costs.

Preferably, the thickness of the layers of the structural body is varied from layer to layer, depending on the complexity of the layers to be produced and/or the extent of the changes in geometry. If, for example, the shape of several subsequent layers is identical, increasing the layer thickness reduces the manufacturing period without any loss of accuracy.

As regards the apparatus, the present invention solves the problem by providing a rapid-prototyping apparatus comprising a supporting liquid receptacle being open at the top, a base being driven for step-wise vertical movement within the supporting liquid receptacle, the steps being program-controlled according to the desired thickness of the layers, a means for maintaining the liquid level constant independently of the amount of deposited building material, a program-controlled drop-on-demand application device being movable in a horizontal plane across the receptacle and a leveling tool being horizontally movable across the receptacle.

A variant of the rapid-prototyping apparatus according to the present invention does not comprise a particular supporting liquid application device. In this case, application of the supporting liquid to the structural body and filling of the recesses in the layer which was produced during the foregoing cycle are performed by lowering the base or platform in the reservoir of supporting liquid until the structural body is completely covered by the supporting liquid contained in the supporting liquid receptacle and subsequently lifting it again.

Another variant of the rapid-prototyping apparatus according to the present invention comprises, as an alternative or in addition, a supporting liquid application device by means of which a supporting liquid can be deposited to cover the whole surface of the part.

The supporting liquid application device can be formed to be e.g. an individual nozzle being movable in two dimensions or a two-dimensional nozzle array. in other cases, the supporting liquid application device comprises a horizontally movable bar comprising a line of nozzles, into which bar the leveling instrument is integrated.

Preferably the supporting liquid application device comprises a level recognition system, i.e. a sensory mechanism by means of which the current level of the supporting liquid surface in the remaining subareas of the layer produced during the last cycle can be detected. By means of a suitable control device the supporting liquid application device can be controlled on the basis of the values determined in that way.

For all variants of the apparatus according to the present invention the leveling instrument is preferred to be heatable. This reduces the tendency of the supporting liquid to stick to the leveling instrument. Thus, a smoother surface of the supporting liquid deposited can be achieved.

According to the present invention it is possible for the leveling instrument to be formed such that, while the surface of the supporting liquid is smoothened, dents in the surface of the layer produced during the last cycle are at the same time removed mechanically, i.e. a so-called Z-correction is made. For this purpose the leveling instrument can be formed to be e.g. a sharp blade. This has the advantage that a higher degree of accuracy of the structural body is achieved.

However, the leveling instrument may be even formed such that dents in the surface of the layer produced during the last cycle are not removed but tolerated when the surface of the supporting liquid is wiped by means of the leveling means in order to be smoothened. This can be achieved e.g. by using a leveling instrument (wiper) comprising a rubber edge. It is true that with such an embodiment it is accepted that irregularities in height within an individual layer of the structural body are not levelled out. However, since the irregularities are levelled out statistically when a large number of layers is produced, the deterioration of the accuracy of the structural body frequently does not exceed an acceptable range. Since no material is removed mechanically, the body is prevented from being damaged by the leveling instrument. In connection with the building materials used according to the present invention this risk is particularly high.

According to the present invention any suitable apparatus can serve as the drop-on-demand application device. Preferably, a print head using a piezoelectric system is employed. Devices comprising a large number of nozzles may be used. Particularly, a print head using a piezoelectric paddle technique is preferred. Piezoelectric paddle technique is to be understood as the use of a piezoelectric bending converter which is fixed at its one end and neighbouring to the other protruding end of which the nozzle opening is located through which the piezoelectric bending converter discharges fluid by means of paddling movements.

It is true that the method and apparatus according to the present invention are particularly well-suited for the use in home-workshops. However, the use of the method and apparatus according to the present invention is not restricted to home-workshops.

Embodiments of the present invention are described in connection with the drawings. In the drawings.

Figure 1A:
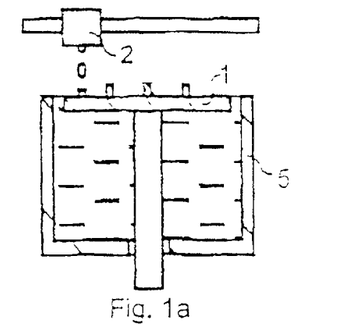
FIGS. 1*a* to 1*g* schematically show the individual procedure steps of a preferred embodiment of the method according to the present invention.
Figure 3:
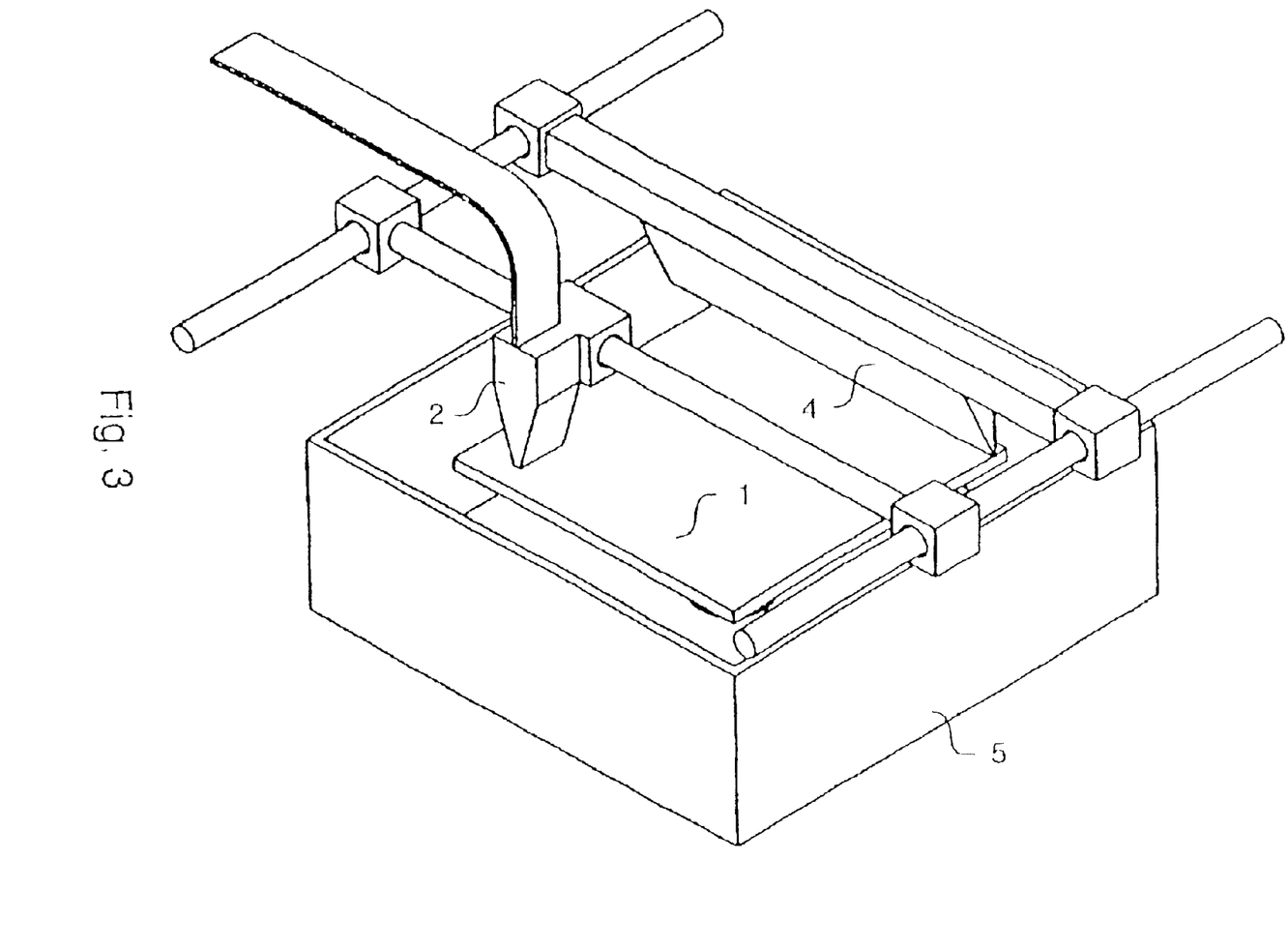
FIG. 3 shows a schematic view of an embodiment of the apparatus according to the present invention which is suitable for performing the method according to FIGS. 1*a* to 1*g*.

The design of a rapid-prototyping apparatus according to an embodiment of the present invention is apparent from FIG. 3. The apparatus comprises a supporting liquid receptacle 5 being open at the top and being filled with supporting liquid, in which receptacle 5 a vertically movable base or platform 1 is arranged. Above the base 1 a drop-on-demand application device 2 is provided, being movable in a horizontal plane. Furthermore, a leveling instrument 4 is provided which is movable horizontally above the base. The basic functioning of the rapid-prototyping apparatus according to FIG. 3 is apparent from FIGS. 1a to 1g. This corresponds to an embodiment of the method according to the present invention. In the following the individual procedure steps apparent from FIGS. 1a to 1g will be described:

As is apparent from FIG. 1a, the base 1 first projects from the supporting liquid contained in the supporting liquid receptacle 5, the supporting liquid having a slightly higher density than the building material that is subsequently used. By moving the drop-on-demand application device 2 and selective deposition of the building material a first layer of the structural body is formed on the base 1. Here, this first layer of the structural body consists of a solid spaced supporting structure pins solely.

Figure 1B:
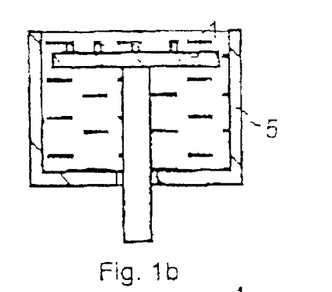

As is apparent from FIG. 1b, the base 1 being provided with the first layer of the structural body is lowered into the bath of supporting liquid until the layer of the structural body is completely covered by the supporting liquid.

Subsequently the base 1 is lifted until the upper side of the layer of the structural body and the surface of the supporting liquid are flush, as is apparent from FIG. 1c. Then, the upper side of the layer of the structural body is wiped by means of the heated leveling instrument 4, so that a smooth surface is formed from the upper sides of the layer of the structural body and of the supporting liquid. In this way, the recesses in the layer of the structural body are completely filled with supporting liquid.

Figure 1C:
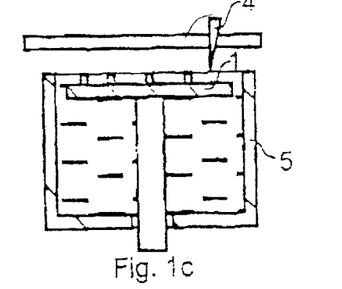
Figure 1D:
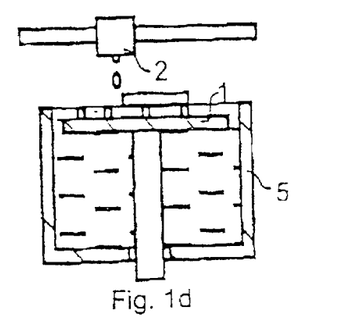

As is apparent from FIG. 1d, a further layer of the structural body is now produced on the flush surface, the latter formed as described above, by moving the drop-on-demand application device 2 in a horizontal plane and selective deposition of building material. Now no longer the solid supporting structure is formed, but structures of the actual structural body are produced in selected subareas of the process area. The application of the building material for forming a layer of the structural body involves the following steps: In a first step building material is deposited to a subarea of the surface of the previous layer, which sub-area is formed by solid structures of building material. The building material deposited is bonded to the building material of the previous layer and therefore cannot float away in the supporting liquid. Then building material is deposited to remaining subareas of the surface of the previous layer, which remaining subareas are formed by supporting liquid. However, further building material is therein only deposited in remaining subareas which are directly adjacent to such subareas in which building material has already been deposited to the current layer previously. Said further building material coming into contact with the supporting liquid then comes simultaneously into contact with building material already deposited and is bonded thereto. Thus, floating away of said further building material due to movements of the supporting liquid is prevented. In this way, further building material is attached laterally to portions of the layer already deposited until the layer of the structural body is completed.

Figure 1E:
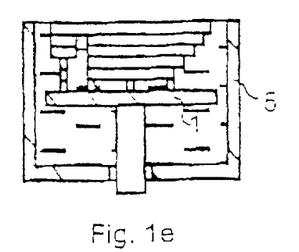

The steps apparent from FIGS. 1b to 1d are repeated until all layers of the structural body are completed, as is depicted in FIG. 1e.

Figure 1F:
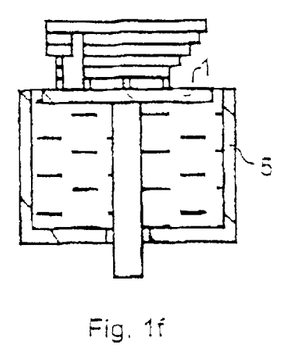

As is apparent from FIG. 1f, the base including the complete structural body is moved out of the supporting liquid receptacle 5 containing supporting liquid, so that the supporting liquid can drip off the structural part.

Figure 1G:
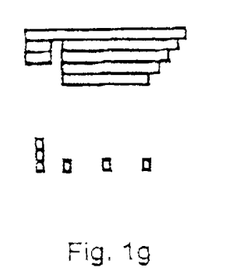

As is apparent from FIG. 1g, solid supporting structures provided in the structural body are now removed mechanically in order to finish the desired product.

The production cycle shown in FIGS. 1a to 1g may also be performed in a way that the base 1 is lowered into the reservoir of supporting liquid in receptacle 5 in each step in such a way that the top surfaces of the building material is not wetted by the supporting liquid before a subsequent layer is deposited. Recesses in a layer of building material may be filled with the supporting liquid by program-controlled forming respective openings in the walls surounding the recess so that the supporting liquid may overflow into the recess when submerging the layer into the supporting liquid.

Figure 4:
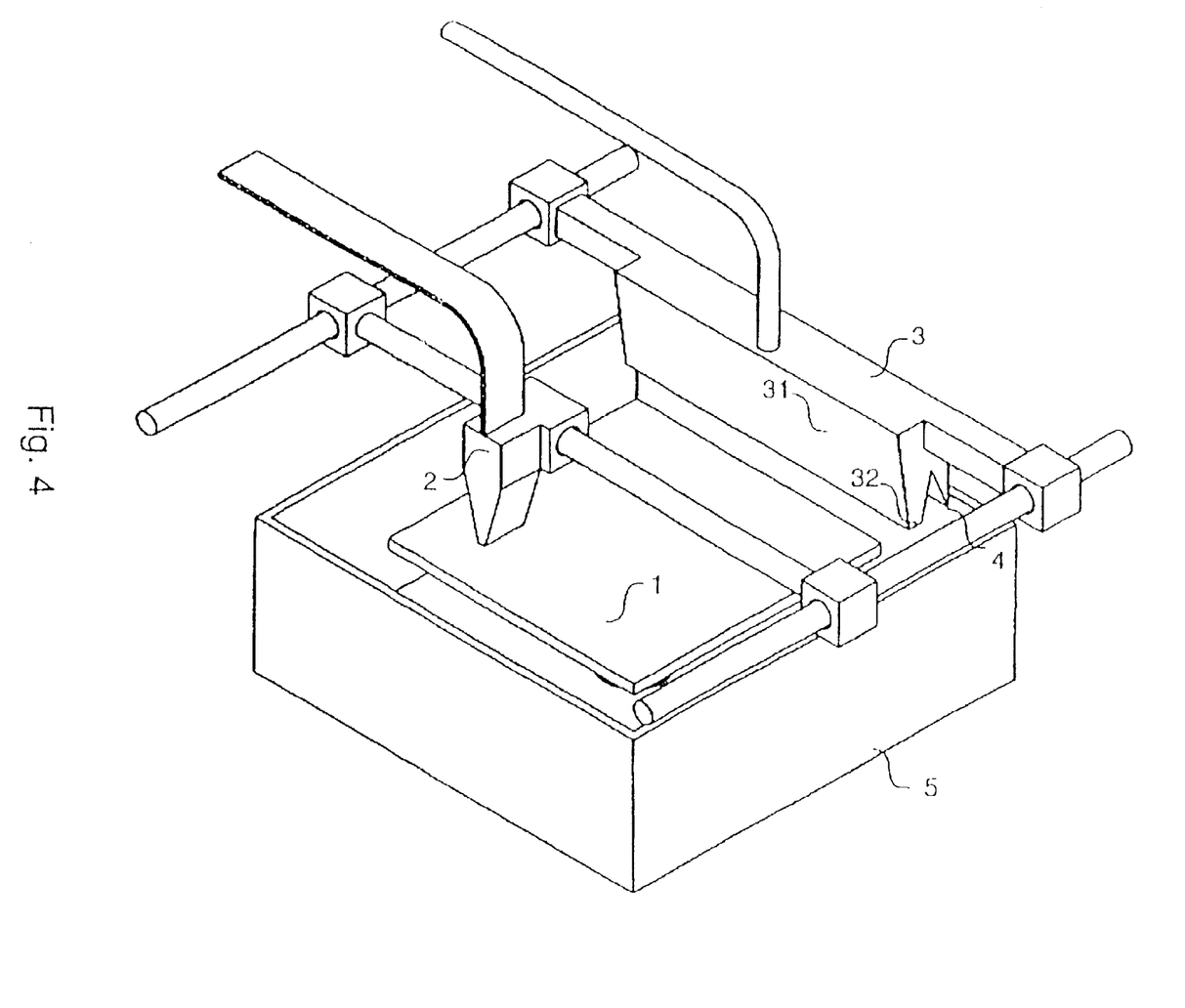
FIG. 4 shows a schematic view of another embodiment of the apparatus according to the present invention which is suitable for performing the process according to FIGS. 2*a* to 2*g*.

The design of a rapid-prototyping apparatus according to a further embodiment of the present invention is apparent from FIG. 4. The apparatus comprises a supporting liquid receptacle 5 being open at the top and being filled with supporting liquid, in which receptacle 5 a vertically movable base 1 is arranged. Above the base 1 a drop-on-demand application device 2 is provided, being movable in a horizontal plane. A supporting liquid application device 3 comprises a horizontal bar 31 comprising a line of nozzles 32 which is horizontally movable above the base 1. A heatable leveling instrument 4 is integrated into the bar 31.

Figure 2A:
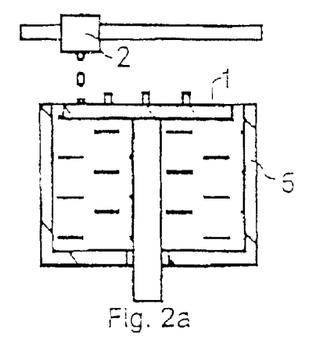
FIGS. 2*a* to 2*g* schematically show the individual procedure steps of another preferred embodiment of the method according to the present invention.

The basic functioning of the rapid-prototyping apparatus according to FIG. 4 is apparent from FIGS. 2a to 2g. This corresponds to an embodiment of the method according to the present invention. In the following the individual procedure steps of the method according to the present invention apparent from FIGS. 2a to 2g will be described:

As is apparent from FIG. 2a, the base 1 first projects from the supporting liquid contained in the supporting liquid receptacle 5, the supporting liquid having a slightly higher density than the building material that is subsequently used. By moving the drop-on-demand application device 2 and selective deposition of the building material a first layer of the structural body is formed on the base 1. Here, this first layer of the structural body consists of a solid supporting structure solely.

Figure 2B:
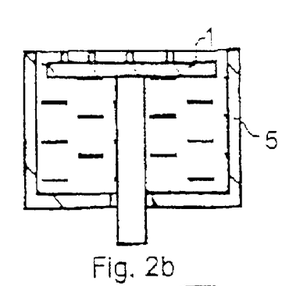

As is apparent from FIG. 2b, the base 1 comprising the first layer of the structural body is lowered into the supporting liquid receptacle 5 until the surface of the supporting liquid contained therein and the upper side of the structural body form a single plane.

Figure 2C:
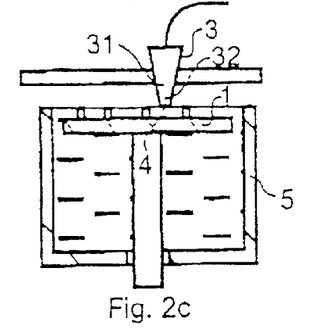
Figure 2D:
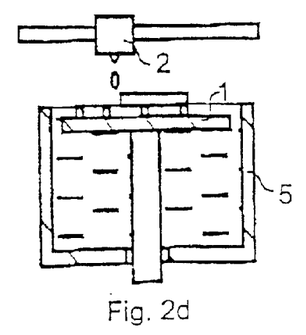
Figure 2E:
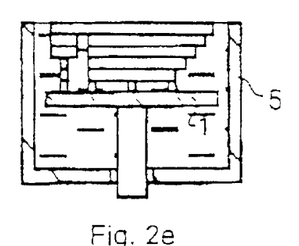
Figure 2F:
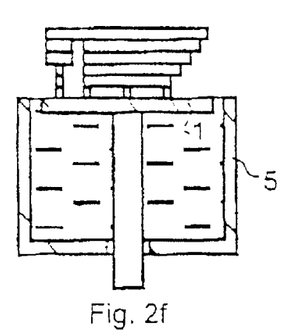
Figure 2G:
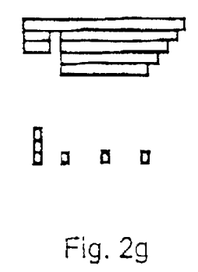

Subsequently, as is apparent from FIG. 2c, the bar 31 comprising the line of nozzles 32 is moved above the base 1, wherein at the same time supporting liquid is deposited to the structural part. At the same time the leveling instrument 4 integrated into the bar 31 is drawn across the upper side of the layer of the structural part, so that supporting liquid is forced into the recesses in the layer, these recesses are completely filled with supporting liquid and a smooth surface is formed from the upper side of the layer of the structural body and the surface of the supporting liquid.

The procedure steps apparent from FIGS. 2d to 2g correspond to the procedure steps described above in connection with FIGS. 1d to 1g.

What is claimed is:

1. A rapid-prototyping method for producing a structural body by a production process of multiple subsequent depositions of layers of a building material, each subsequent layer of the building material being deposited onto a top surface of a next preceding layer of the building material, the building material having a predetermined first density and being selectively deposited for each layer in a liquid state in a form of droplets into selected subareas of a process area and being caused to start to solidify during deposition, after which a supporting fluid having a liquid state is filled into remaining subareas of said process area which adjoin the selected subareas thereof, wherein the supporting fluid is selected to have a second density which is at least equal to the first density of the building material and is selected to remain in its liquid state throughout the production process, end the remaining subareas of each next preceding layer are filled with the supporting fluid substantially up to the top surface of the building material of said each next preceding layer before the building material of the subsequent layer is deposited thereon without wetting the top surface of the building material with supporting fluid.

2. The method according to claim 1, wherein the remaining subareas of the next preceding layer are filled with the supporting fluid by causing the supporting fluid to flow into the remaining subareas.

3. The method according to claim 2, wherein the supporting fluid is caused to flow into the remaining subareas of the next preceding layer out of a reservoir of supporting fluid having a liquid level by lowering the next preceding layer into the reservoir.

4. The method according to claim 3, wherein the liquid level is maintained constant by means of an overflow of the reservoir.

5. The method according to claim 1, wherein the deposition of the building material for the next preceding layer includes forming of supporting structures for supporting a portion of the subsequent layer.

6. The method according to claim 5, wherein the production process is started by deposition of a lowest layer of the building material onto a platform so as to form spaced apart supporting structures on the platform for supporting a next lowest layer of the building material.

7. The method according to claim 5, wherein said portion of the subsequent layer is a tip of a banging portion intended to hang down from a layer above said subsequent layer.

8. The method according to claim 1, wherein the subsequent layer of the building material is intended to include extending portions of building materiel extending from a portion of the top surface of building material of the next preceding layer over portions of the remaining subareas of the next preceding layer, and the extending portions are formed by starting with deposition of building material from said portion of the top surface and proceeding with deposition of building material along the intended extending portion onto the supporting fluid which was filled into the remaining subareas of the next preceding layer.

9. The method according to claim 1, wherein the subsequent layer of the building material is intended to include extending portions of the building material extending from a portion of the top surface of the building material of the next preceding layer over portions of the remaining subareas of the next preceding layer, and the extending portions of the building material are formed by starting with deposition of the building material onto the supporting fluid which were filled into the remaining subareas of the next preceding layer and proceeding with deposition of the building material along the intended extending portion towards said portion of the top surface.

10. The method of claim 2, wherein the subsequent layer is intended to include surrounding wall portions surrounding a recess portion of the remaining subareas, and the surrounding wall portions are formed, by deposition of the building material, with an opening allowing the supporting fluid to flow into the recess portion.

11. The method according to claim 1, wherein the top surface of the preceding layer is leveled to extend in a horizontal plane before the supporting fluid is filled into the remaining subareas of the preceding layer.

12. The method according to claim 1, wherein the supporting fluid has a viscosity in the range approximately from 150 to 400 mPa's.

13. The method according to claim 1, wherein the supporting fluid contains an additive for reducing a surface tension of the supporting fluid.

14. The method according to claim 1, wherein the second density of the supporting fluid is higher than the first density of the building material.

15. The method according to claim 14, wherein the second density of the supporting fluid is approximately 1.01 to 2 times, as high as compared to the first density of the building material.

16. The method according to claim 1, wherein the supporting fluid is a glycerine solution.

17. The method according to claim 16, wherein the glycerine solution comprises an aqueous solution containing glycerine in an amount of approximately 85% by weight and propylenglycol 1.2-propandiol or polysorbat 20 as an additive.

18. The method according claim 1, wherein the building material comprises a fusible material and has a viscosity of not more than 20 mPa's when in a molten state at a temperature of not more than 130° C.

19. The method according to claim 1, wherein the building material comprises at least one liquid resin material which solidifies by reaction with a chemical reaction agent contained in a chemical reaction atmosphere surrounding the building material during deposition.

20. The method according to claim 1, wherein the building material comprises at least one thermosettable resin material and during deposition, the building material is subjected to heat for starting solidification thereof by thermosetting.

21. A rapid-prototyping method for producing a structural body by a production process of multiple subsequent depositions of layers of a building material, each subsequent layer of the building material being deposited onto a top surface of a next preceding layer of the building material, the building material having a predetermined first density and being selectively deposited for each layer in a liquid state in a form of droplets into selected subareas of a process area and being caused to start to solidify dining deposition, after which a supporting fluid having a liquid state is filled into remaining subareas of said process area which adjoin the selected subareas thereof, wherein the supporting fluid is selected to have a second density which is at least equal to the first density of the building material and is selected to remain in its liquid state throughout the production process, and the remaining subareas of each next preceding layer are filled with the supporting fluid substantially up to the top surface of the building material of said each next preceding layer before the building material of the subsequent layer is deposited thereon, and the building material comprises at least one liquid main material which is solidified by a reaction with a chemical reaction agent which is contained in the supporting liquid.

22. The method according to claim 14, wherein the second density of the supporting fluid is approximately 1.05 to 1.5 times as high us compared to the first density of the building-material.

23. The method according to claim 18, wherein the building material comprises a wax material or a thermoplastic material.

24. The method according to claim 21, wherein the remaining subareas of the next preceding layer are filled with the supporting fluid by causing the supporting fluid to flow into the remaining subareas.

25. The method according to claim 24, wherein the supporting fluid is caused to flow into the remaining subareas of the next preceding layer out of a reservoir of supporting fluid having a liquid level by lowering the next preceding layer into the reservoir.

26. The method according to claim 25, wherein the liquid level is maintained constant by means of an overflow of the reservoir.

27. The method according to claim 21, wherein the deposition of the building material for the next preceding layer includes forming of supporting structures for supporting a portion of the subsequent layer.

28. The method according to claim 27, wherein the production process is started by deposition of a lowest layer of the building material onto a platform so as to form spaced apart supporting structures on the platform for supporting a next lowest layer of the building material.

29. The method according to claim 27, wherein said portion of the subsequent layer is a tip of a hanging portion intended to hang down from a layer above said subsequent layer.

30. The method according to claim 21, wherein the subsequent layer of the building material is intended to include extending portions of building material extending from a portion of the top surface of building material of the next preceding layer over portions of the remaining subareas of the next preceding layer, and the extending portions are formed by starting with deposition of building material from said portion of the top surface and preceding with deposition of building material along the intended extending portion of the supporting fluid which was filled into the remaining subareas of the next preceding layer.

31. The method according to claim 21, wherein the subsequent layer of the building material is intended to include extending portions of the building material extending from a portion of the top surface of the building material of the next preceding layer over portions of the remaining subareas of the next preceding layer, and the extending portions of the building material are formed by starting with deposition of the building material onto the supporting fluid which were filled into the remaining subareas of the next preceding layer and proceeding with deposition of the building material along the intended extending portion towards said portion of the top surface.

32. The method of claim 24, wherein the subsequent layer is intended to include surrounding wall portions surrounding a recess pardon of the remaining subareas, and the surrounding wall portions are formed, by deposition of the building material, with an opening allowing the supporting fluid to flow into the recess portion.

33. The method according to claim 21, wherein the top surface of the preceding layer is leveled to extend in a horizontal plane before the supporting fluid is filled into the remaining subareas of the preceding layer.

34. The method according to claim 21, wherein the supporting fluid has a viscosity in the range approximately from 150 to 400 mPa's.

35. The method according to claim 21, wherein the supporting fluid contains an additive for reducing a surface tension of the supporting fluid.

36. The method according to claim 21, wherein the second density of the supporting fluid is higher than the first density of the building material.

37. The method according to claim 36, wherein the second density of the supporting fluid is approximately 1.01 to 2 times, as high as compared to the first density of the building material.

38. The method according to claim 36, wherein the second density of the supporting fluid is approximately 1.05 to 1.5 times as high as compared to the first density of the building-material.

39. The method according to claim 21, wherein the supporting fluid is a glycerine solution.

40. The method according to claim 39, wherein the glycerine solution comprises an aqueous solution containing glycerine in an amount of approximately 85% by weight and propylenglycol 1.2-propandiol or polysorbat 20 as an additive.

41. The method according to claim 21, wherein the budding material comprises a fusible material and has a viscosity of not more than 20 mPa's when in a molten state at a temperature of not more than 130° C.

42. The method according to claim 41, wherein the building material comprises a wax material or a thermoplastic material.

43. The method according to claim 21, wherein the building material comprises at least one liquid resin material which solidifies by reaction with a chemical suction agent contained in a chemical reaction atmosphere surrounding the building material during deposition.

* * * * *

UNITED STATES PATENT AND TRADEMARK OFFICE
CERTIFICATE OF CORRECTION

PATENT NO. : 6,838,035 B1
DATED : January 4, 2005
INVENTOR(S) : Ingo Ederer et al.

It is certified that error appears in the above-identified patent and that said Letters Patent is hereby corrected as shown below:

Column 11,
Line 3, "end" should read -- and --.
Line 31, "banging" should read -- hanging --.
Line 35, "materiel" should read -- material --.
Line 68, "mPa's" should read -- mPa·s --.

Column 12,
Line 20, "mPa's" should read -- mPa·s --.
Line 40, "dining" should read -- during --.
Line 52, "main" should read -- resin --, delete "a"
Line 57, "us" should read -- as --.

Column 13,
Line 27, "preceding" should read -- proceeding --.
Line 28, the second occurrence of "of" should read -- onto --.
Line 45, "pardon" should read -- portion --.

Column 14,
Line 10, "mPa's" should read -- mPa·s --.
Line 33, "budding" should read -- building --.
Line 34, "mPa's" should read -- mPa·s --.
Line 41, "suction" should read -- reaction --.

Signed and Sealed this

Twelfth Day of April, 2005

JON W. DUDAS
*Director of the United States Patent and Trademark Office*